United States Patent
Ashtari et al.

(10) Patent No.: US 10,987,881 B2
(45) Date of Patent: Apr. 27, 2021

(54) METHOD FOR IMMOBILISING A PREFORM IN A MOULD

(71) Applicant: SNECMA, Paris (FR)

(72) Inventors: Nicolas Ashtari, Paris (FR); Marc-Emmanuel Techer, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 282 days.

(21) Appl. No.: 14/880,006

(22) Filed: Oct. 9, 2015

(65) Prior Publication Data
US 2016/0101575 A1   Apr. 14, 2016

(30) Foreign Application Priority Data
Oct. 10, 2014  (FR) ...................................... 1459739

(51) Int. Cl.
| | | |
|---|---|---|
| *B29C 70/54* | (2006.01) | |
| *B29C 70/48* | (2006.01) | |
| *B29K 101/10* | (2006.01) | |
| *B29K 105/08* | (2006.01) | |
| *B29K 307/04* | (2006.01) | |

(Continued)

(52) U.S. Cl.
CPC ............ *B29C 70/543* (2013.01); *B29C 70/48* (2013.01); *B29C 70/541* (2013.01); *B29C 70/24* (2013.01); *B29C 70/545* (2013.01); *B29C 2793/009* (2013.01); *B29K 2101/10* (2013.01); *B29K 2105/0845* (2013.01); *B29K 2307/04* (2013.01); *B29L 2031/08* (2013.01); *B29L 2031/082* (2013.01)

(58) Field of Classification Search
None
See application file for complete search history.

(56) References Cited

U.S. PATENT DOCUMENTS 2,859,936 A * 11/1958  Warnken ............. B29C 45/0005
156/296
5,066,442 A   11/1991  Gutowski
(Continued)

FOREIGN PATENT DOCUMENTS

| EP | 1 433 631 A1 | 6/2004 |
|---|---|---|
| EP | 1 916 092 A1 | 4/2008 |
| WO | 2014/147130 A1 | 9/2014 |

OTHER PUBLICATIONS

Rapport de Recherche Préliminaire, dated Jun. 22, 2015, issued in corresponding French Application No. 1459739, filed Oct. 10, 2014, 2 pages.

*Primary Examiner* — Monica A Huson
(74) *Attorney, Agent, or Firm* — Christensen O'Connor Johnson Kindness PLLC

(57) ABSTRACT

A method for manufacturing a turbine-engine blade from a preform made from polymerized composite material in a mold comprising a bottom part and a top part, comprising at least one closure step during which the top part of said mold is attached to the bottom part of the mold containing the preform, wherein it comprises, prior to said closure step, at least one insertion substep during which a first end of an immobilization element is inserted in a bottom part of the preform in a substantially transverse direction, and a positioning substep during which a second, opposite end of said element is disposed in a complementary reception cavity emerging in the bottom part of the mold.

8 Claims, 2 Drawing Sheets

(51) Int. Cl.
  *B29L 31/08* (2006.01)
  *B29C 70/24* (2006.01)

(56) References Cited

U.S. PATENT DOCUMENTS

| | | |
|---|---|---|
| 2008/0099965 A1 | 5/2008 | Romero |
| 2010/0288429 A1 | 11/2010 | Mathon |
| 2012/0267039 A1* | 10/2012 | Dambrine ............... B29C 70/48 156/148 |

* cited by examiner

METHOD FOR IMMOBILISING A PREFORM IN A MOULD

FIELD OF THE DISCLOSURE

The present disclosure relates to the manufacture of gas-turbine engines, such as turbine engines, and in particular those intended for propelling aircraft. The present disclosure relates more particularly to a method for manufacturing a turbine-engine blade made from composite material, a preform intended to form the blade of the turbine engine, and a mold for executing such a method.

BACKGROUND OF THE DISCLOSURE

A turbine-engine blade conventionally has a root and a vane, the root comprising oblique lateral faces connecting to the vane and intended to form support surfaces in an alveolus for mounting a rotor disc. The blade is generally produced from lightweight materials in order to participate in the lightening of the turbine engine in order to limit the inertia of the rotor of which it forms part.

A turbine-engine blade is also subjected to particularly high stresses at its root, in particular at the bearing surfaces. This is because the forces exerted on the airflow by the vane, in the radially external zone thereof, create high stresses at its attachment zone, that is to say in the root of the blade. This leads to using material that is both lightweight and strong for manufacturing the blade.

One known solution to these stresses consists of using a composite material. Producing a blade by means of a preform formed by weaving fibers is thus known, said fibers being compacted and embedded in a thermosetting resin matrix. The fibers thus provide the function of mechanical reinforcement, the resin matrix providing the strength of the blade.

The document EP-A1-1.526.285, in the name of the applicant, describes a method for manufacturing a preform by weaving fibers in three dimensions, in particular carbon fibers. The preform thus obtained comprises a root part and a vane part, connected by oblique lateral faces intended to form bearing surfaces of the root in an alveolus for mounting a rotor disc. As described in the document EP-A1-1.777.063, also in the name of the applicant, the preform is next disposed in a mold, the cavity of which comprises a root zone and a vane zone, which are connected to each other by oblique lateral faces corresponding to the aforementioned lateral faces of the preform. The relaxing of the fibers after weaving of the preform causes an expansion thereof, also known by the term swelling phenomenon. The preform then has dimensions greater than the dimensions of the part to be produced.

The document EP-A1-1.196.092, in the name of the applicant, also describes a method for manufacturing a specimen blade obtained by impregnating a preform obtained by weaving fibers in three dimensions. This method is similar to the previous ones.

The preform is first of all compacted in a mold comprising a bottom part and a top part. To do this, the preform is disposed in the bottom part of the mold and then the mold is closed by attaching the top part of the mold to the bottom part, transversely with respect to the longitudinal axis of the blade, and the root of the preform is acted on axially by means of a movable part of the mold that is interposed between the bottom and top parts. The role of this movable part is to oblige the fibers of the root of the preform to be pressed against the oblique faces of the mold.

Then a partial vacuum is produced in the mold and a thermosetting resin is injected into the mold so as to impregnate the entire preform.

The preform and the resin are next heated in order to polymerize—and therefore harden—the resin. The fibers are then held in position by the resin matrix and the whole forms a blade that is both lightweight and rigid. Pressing the fibers of the preform against the oblique lateral faces of the mold allows to limit the hollows at its zones intended to form the bearing surfaces of the root in an alveolus for mounting a rotor disc.

The existence of many hollows causes in fact, after injection of the resin, masses or pockets of resin which, by themselves alone, have low mechanical strengths. The bearing surfaces being zones subjected to high stresses, it is necessary to limit the appearance of such masses or pockets of resin, which is obtained by acting on the root of the preform by means of the movable part of the mold.

However, it has been found that another source of defects lies in the positioning of the fabric preform in the bottom part of the mold.

This is because the positioning of this fabric preform in the injection mold is tricky but essential. However, closing the top part of the mold is liable to apply a force to the preform, which may have a tendency to shift in the mold and to move into a faulty position. Consequently the preform may locally no longer be pressed against the walls of the mold, and thereby the surface of the blade may, after injection of the resin, exhibit masses or pockets of resin corresponding to the zones that have not been occupied by the weaving.

The mechanical strength of these zones is less than what is normally required for such a blade, and for this reason the presence of such masses or pockets of resin must absolutely be avoided.

Unsuitable positioning of the fabric of the preform may be noted only after injection and removal of the part from the mold. No repair procedure is then possible and the part must then be scrapped.

The document US-A1-2010/0288429, which does not relate to the technical field of the disclosure, describes a device for attaching a first layer of fibers in order to assist the winding of several layers of fibers intended to form a cylindrical casing prior to the removal of said attachment device and to the impregnation of the fibers.

The documents WO-A1-2014/147130 and EP-A1-1.433.631, which do not relate to the technical field of the disclosure, each describe devices for clamping a part in a mold, respectively a thermoformable sheet or a decorative element that is to be insert-molded in an injection mold, in order to hold it in said mold. These documents do not relate to parts obtained by the weaving of fibers.

SUMMARY OF THE DISCLOSURE

Embodiments of the present disclosure remedy the aforementioned drawback and/or others by proposing a manufacturing method guaranteeing the position of the woven preform in the mold.

Thus, embodiments of the present disclosure provide a method for manufacturing a turbine-engine blade made from composite material comprising: producing a preform of general axial orientation, by weaving threads in three dimensions, said preform comprising a blade root part and a blade vane part, placing the preform in a bottom part of a mold, a recess of which is substantially complementary to bottom parts of the blade root part and of the blade vane part of the preform, closing the mold, consisting of attaching a top part of said mold, a recess of which is complementary to top parts of the blade root part and of the blade vane part of the preform, on the bottom part of the mold containing the preform, compacting the preform in said mold, and injecting a resin into the mold under vacuum in order to impregnate the compacted preform and to form a rigid blade after polymerization of the resin.

In accordance with one or more aspects of the present disclosure, one or more representative methods are characterized in that it comprises, prior to closing the mold, an insertion of a first end of an immobilization element in the bottom part of the preform in a substantially transverse direction, and a positioning of a second, opposite end of said element in a complementary reception cavity emerging in the bottom part of the mold.

In accordance with other embodiments, the method can include, in any combination, one or more of the following:
- after injection of the resign, the second end of the element can be eliminated;
- insertion of the of the first end of an immobilization element occurs prior to placing the preform in a bottom part of a mold, and positioning the second, opposite end of said element occurs during the placement of the preform in a bottom part of a mold;
- positioning the second, opposite end of said element occurs during placement of the preform in a bottom part of a mold, and insertion of the of the first end of an immobilization element occurs during placement of the preform in a bottom part of a mold subsequent to the positioning of the second, opposite end;
- during insertion of the of the first end of an immobilization element, the immobilization element is inserted in a zone of the bottom part of the blade root intended to form part of a subsequently eliminated trimming;
- removing the polymerized rough preform from the mold and is then cut in order to separate trimmings from it, in order to obtain the final blade, wherein elimination of the second end of said element being performed concomitantly with said cutting.

In accordance with another aspect of the present disclosure, an immobilization element is provide that is able to cooperate firstly with a preform of general axial orientation, obtained by three-dimensional weaving of threads made from composite materials, of a turbine-engine blade, and secondly with a mold for impregnating said preform.

In some embodiments, said immobilization element comprises a first end able to be inserted in the weaving of the preform and a second, opposite end able to project out of the preform and to cooperate with the mold, said element being configured so as to cooperate with said preform and with said mold for placing said preform in said mold and during the impregnation of said preform in the mold.

In accordance with other embodiments, the immobilization element can include one or more of the following:
- the first end being configured in a peak or point;
- the second end being formed as a pin able to cooperate with a complementary-shaped cavity of the mold.

In accordance with yet another aspect of the present disclosure, an impregnation mold is provided for manufacturing a turbine-engine blade made from composite material, comprising a bottom mold part, a recess of which is substantially complementary to a bottom part of a blade preform, and a top part, a recess of which is substantially complementary to a top part of the blade preform, said top part being able to be attached to said bottom part. This mold is characterized in that the bottom part comprises at least one cavity emerging inside the recess, which is complementary to an immobilization element secured to the blade preform, and which is able to provide reception thereof.

According to another embodiment of the mold, the cavity can emerge in a part of the recess in the bottom part of the mold that does not delimit a functional surface of the final blade.

BRIEF DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION OF THE DISCLOSURE

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following discussion provides examples of methods for manufacturing a turbine-engine blade made from composite material. The following also provides examples of a preform intended to form the blade of the turbine engine. The following further provides examples of a mold for executing such methods disclosed herein.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
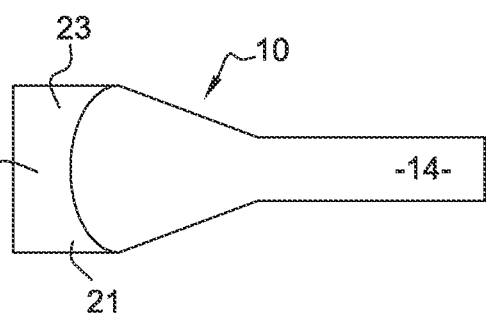
FIG. 1 is a schematic view of a preform used in the context of a representative method according to an aspect of the present disclosure.

In a known manner, a method for manufacturing a turbine-engine blade made from composite material comprises a first step during which a preform 10 is produced by weaving threads (not shown) in three dimensions, as shown in FIG. 1. Such a preform 10 has a general axial orientation, corresponding to the horizontal direction of the figures.

The preform 10 is produced by weaving in a single piece, generally made from carbon fibers, and substantially comprises a blade root part 12, intended to attach the finished blade to a turbine-engine rotor disc, and a blade vane part 14 intended to cooperate with a flow of air or gas in the turbine engine.

Figure 2:
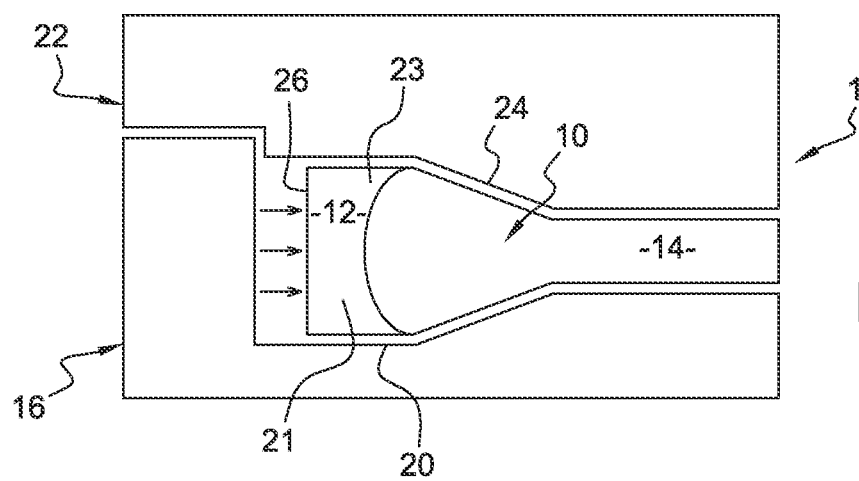
FIG. 2 is a schematic view in cross section representing closure of a mold of a molding method according to a prior art.

In a second step of such a method, the preform 10 is placed in a bottom part 16 of a mold 18 such as the one depicted in FIG. 2. The bottom part 16 comprises a recess 20 that is substantially complementary to a bottom part 21 of the preform, that is to say bottom parts of the blade root part 12 and the blade vane part 14 of the preform 10.

The mold 18 comprises a top part 22 that is attached to the bottom part 16 during a third step of closure of the mold 18. This top part 22 comprises a recess 24 that is complementary to a top part 23 of the preform 10, that is to say top parts of the blade root part 12 and of the blade vane part 14 of the preform 10. Closure of the mold 18 delimits a complete recess, consisting of the recess 20 and the recess 24, which allows resin to be injected into the preform 10.

A fourth step of the method comprises compacting the preform 10 in said mold 18. During this step, as illustrated by FIG. 2, a force is generally exerted on an end 26 of the root 12 of the preform, so as to compact the fibers in contact with the walls of the recesses 20 and 24, as indicted by the arrows in FIG. 2.

Then, during a fifth injection step, a resin is injected under vacuum into the mold 18 in order to impregnate the compacted preform 10, which allows to form a rigid blade after polymerization of the resin.

Finally, during a sixth finishing step, the polymerized raw preform 10 is removed from the mold and is then cut in order to separate trimmings therefrom, in order to obtain the final blade. In particular, large trimmings are arranged at the free end 26 of the root 12.

It has been found that correct positioning of the fabric preform in the recess 20 of the bottom part 16 of the mold 18 is an essential condition for obtaining a finished blade having optimum strength characteristics. This is because incorrect positioning of the fabric preform in the bottom part of the mold 18 may lead to the preform 10 no longer being pressed against the walls of the mold 18 and as a consequence, the surface of the blade may have, masses or pockets of resin corresponding to the zones that have not been occupied by the weaving.

However, incorrect positioning does not necessarily result from a faulty arrangement of the preform 10 in the bottom part 16 of the mold 18 by the operator, but may occur when the mold 18 is closed. It is in fact when the top part 22 of the mold 18 is closed onto the bottom part 16 that the preform 10 is most liable to move.

Embodiments of the present disclosure remedy this drawback and/or others by proposing a manufacturing method that immobilizes the preform 18 in the mold 10 during closure thereof.

For this purpose, the embodiments provided herein propose a manufacturing method of the type described above, characterized in that it comprises, prior to the third step, at least one insertion substep during which a first end 28 of an immobilization element 30 is inserted in the bottom part 21 of the preform 10 in a substantially transverse direction, and a positioning substep during which a second, opposite end 32 of said element 30 is disposed in a complementary reception cavity 34 emerging in the bottom part 16 of the mold 18.

Figure 3:
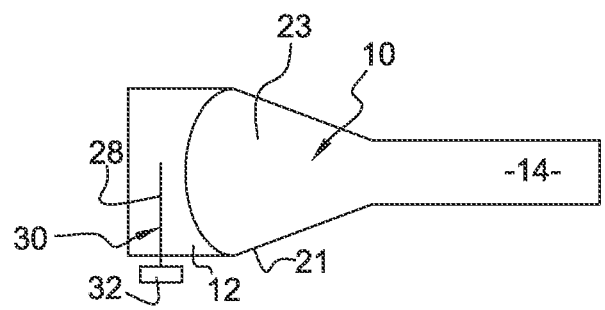
FIG. 3 is a schematic view in cross section representing the insertion substep according to a first embodiment of a manufacturing method according to an aspect of the present disclosure.
Figure 4:
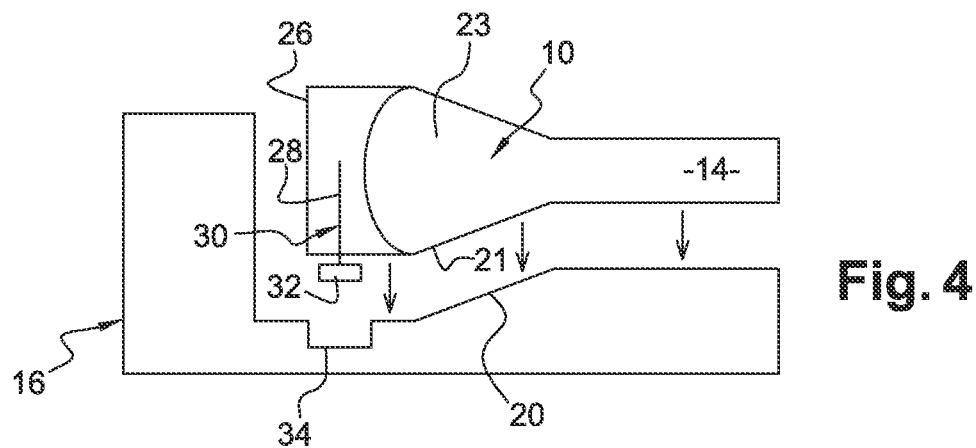
FIG. 4 is a schematic view in cross section representing the positioning substep according to the first embodiment of the manufacturing method according to an aspect of the present disclosure.
Figure 5:
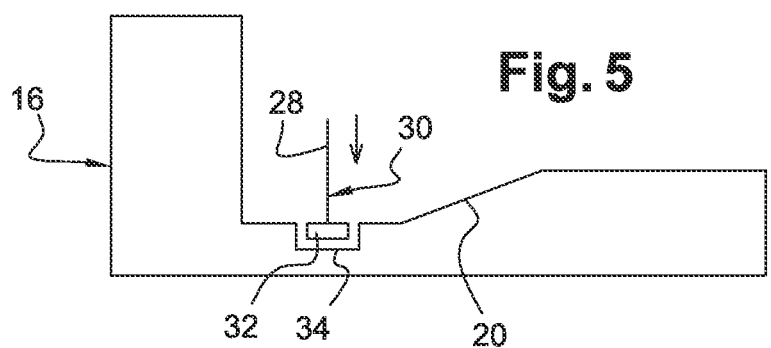
FIG. 5 is a schematic view in cross section representing the positioning substep according to a second embodiment of a manufacturing method according to an aspect of the present disclosure.
Figure 6:
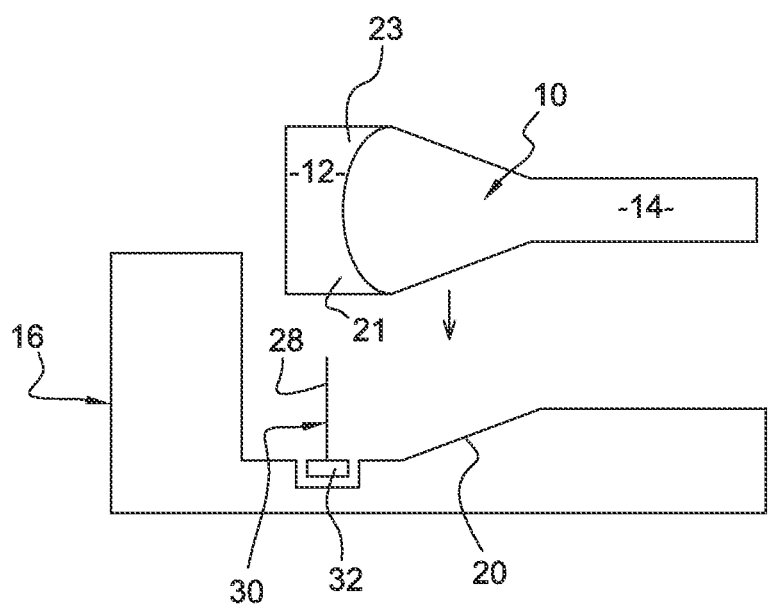
FIG. 6 is a schematic view in cross section representing the insertion substep according to the second embodiment of the manufacturing method according to an aspect of the present disclosure.
Figure 7:
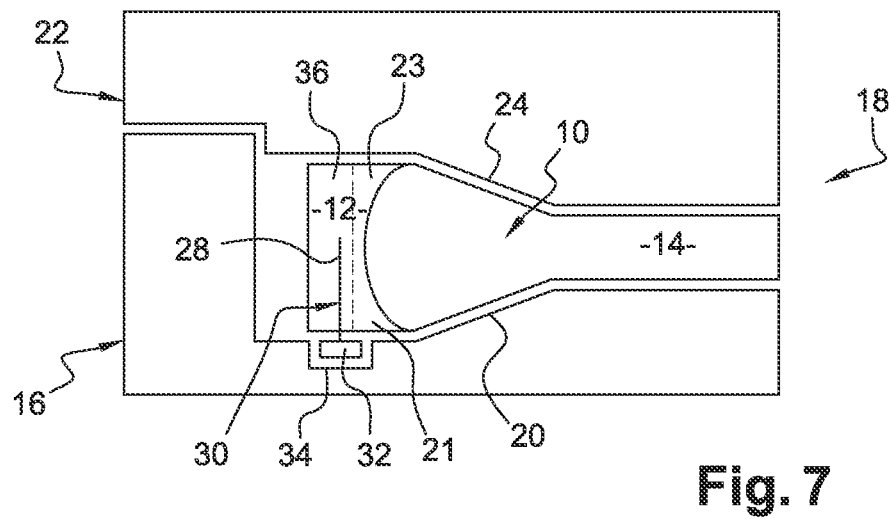
FIG. 7 is a schematic view in cross section representing the third step of closure of the mold according to an aspect of the present disclosure.

To this end, an immobilization element 30 is used which, as illustrated FIGS. 3 to 6, comprises a first end 28 able to be inserted in the weaving of the preform 10 and a second, opposite end which is able to project out of the preform 10 as shown in FIGS. 3, 4, and 7 in order to cooperate with the mold as shown in FIG. 7.

The immobilization element 30 thus allows immobilization of the preform 10 axially, which prevents it from sliding in the recess 20 of the bottom part 6 of the mold 18 when the top part 22 of the mold 18 is closed over the bottom part 16, and also sliding thereof with respect to said top part 22.

Advantageously, to allow insertion of the first end 28 of the immobilization element 30 in the weaving of the preform, this first end 28 is configured in a peak or point in some embodiments.

In some embodiments, the second end 32 is formed as a pin, for example a cylindrical pin, which is able to cooperate with the cavity 34 of complementary shape formed in the bottom part 16 of the mold 10 and which emerges in the recess 20 in said bottom part 16.

The immobilization element 30 may be interposed in two different ways between the preform 10 and the bottom part 126 of the mold.

According to a first embodiment of the method, the insertion substep occurs prior to the second step and the positioning substep occurs during the second step.

Thus, as illustrated by FIG. 3, the first end 28 of the immobilization element 30 is firstly inserted in the preform 10 as shown in FIG. 3, and then the preform 10 provided with the immobilization element is disposed in the recess 20 in the bottom part 16 of the mold 18, so that the second end 32 of the immobilization element enters the cavity 34 of the mold 18. Then the mold 18 is closed as shown in FIG. 7.

According to a second embodiment of the method, the positioning substep occurs during the second step and the insertion substep occurs during the second step subsequently to the positioning substep.

Thus, as illustrated by FIG. 5, the second end 32 of the immobilization element 30 is firstly disposed in the cavity 34 of the recess 20 in the bottom part 16 of the mold 18, as shown in FIG. 5, and then the preform 10 is disposed on the first end 28 of the immobilization element 30 as shown in FIG. 6, so that the first end enters the weaving of the preform 10. Then the mold 18 is closed as shown in FIG. 7.

In this variant of the method, it will be noted that it may be desirable for the second end 32 of the immobilization element 30 to be received in the cavity 34 in a stable way, in order to guarantee transversality, here in the vertical direction, of the immobilization element 30, in order to facilitate entry of its first end 28 into the immobilization element 30.

Moreover, it will be understood that the immobilization element 30 remains interposed between the preform 10 and the bottom part 16 of the mold throughout the fifth step, and consequently during and at the end of the polymerization of the resin. Because of this, when the blade is removed from the mold, the first part of the immobilization element 30 remains trapped in the weaving of the preform.

Thus the method comprises, after the fifth step, a substep of eliminating the second end 32 of the element 30.

In a conventional manner, the mold 18 delimits, in the final blade, a part 36, delimited by the broken lines in FIG. 7, that is not functional and that is able to form part of a trimming that is intended to be cut from the blade emerging from the mold 18 in order to form the final blade.

Preferably, the cavity 34 in one embodiment emerges in a part of the recess 20 in the bottom part 16 of the mold that does not delimit a functional surface of the final blade and which therefore corresponds to this part 36.

The part 36 corresponds to a part intended to be cut when the polymerized raw blade is finished and consequently forms neither a part of the root part 12 intended to secure the blade to a rotor disc, nor a part of the vane part intended to be subjected to a gas flow in the turbine engine. The immobilization element 30 is therefore able to be eliminated at the same time as the part 36 when the blade is cut.

Thus, it will therefore be understood that whatever the embodiment of the method, during the insertion substep the immobilization element 30 is inserted in a zone of the bottom part 36 of the blade root intended to form part of a subsequently eliminated trimming.

Then, during a sixth finishing step, the polymerized rough preform is removed from the mold and then cut in order to separate trimmings therefrom, and in particular the part 36, in order to obtain the final blade. The substep of eliminating the second end 32 of the element 30 is therefore advantageously performed concomitantly with said cutting, eliminating any element 30 trapped in the part 36 of the polymerized preform 10.

Techniques and methodologies of the present disclosure therefore provide a particularly simple and advantageous method that allows to prevent movements of a woven preform 10 in a mold 18 when implementing a method for molding a blade by resin injection, and consequently to limit any defects that might lead the blade to be scrapped. Advantageously, losing by scrapping molded blades, whose cost is significant, is therefore prevented. Because of the long duration of polymerization of such a blade, the use of representative methods of the disclosure, by drastically reducing the number of blades scrapped, significantly increases the production of turbine-engine blades.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for manufacturing a turbine-engine blade made from composite material, the method comprising:
    producing a preform of general axial orientation, by weaving threads in three dimensions, said preform comprising a blade root part and a blade vane part;
    placing the preform in a bottom part of a mold, a recess of which is substantially complementary to bottom parts of the blade root part and of the blade vane part of the preform;
    closing the mold by attaching a top part of said mold, a recess of which is complementary to top parts of the blade root part and of the blade vane part of the preform, on the bottom part of the mold containing the preform;
    compacting the preform in said mold: and
    injecting a resin into the mold under vacuum in order to impregnate the compacted preform and to form a rigid blade after polymerization of the resin,
    wherein, prior to said closing the mold, the method further comprises
        inserting a first end of an immobilization element in a bottom part of the preform in a substantially transverse direction; and
        positioning a second, opposite end of said element in a complementary reception cavity that opens into the recess of the bottom part of the mold.

2. The method according to claim 1, further comprising, after said injecting a resin, eliminating the second end of said element.

3. The method according to claim 1, wherein said inserting a first end of an immobilization element in a bottom part of the preform occurs prior to placing the preform in a bottom part of a mold, and wherein said positioning a second, opposite end of said element in a complementary reception cavity occurs during the second step.

4. The method according to claim 1, wherein said positioning a second, opposite end of said element in a complementary reception cavity occurs during said placing the preform in a bottom part of a mold, and wherein said inserting a first end of an immobilization element in a bottom part of the preform occurs during said placing the preform in a bottom part of a mold and subsequent to said positioning a second, opposite end of said element in a complementary reception cavity.

5. The method according to claim 2, wherein:
    during said inserting a first end of an immobilization element in a bottom part of the preform, the immobilization element is inserted in a zone of the bottom part of the blade root intended to form part of a subsequently eliminated trimming;
    the method further comprising
    removing the polymerized rough preform from the mold and then cutting in order to separate trimmings from it, in order to obtain the final blade, wherein said eliminating the second end of said element being performed concomitantly with said cutting.

6. Impregnation mold for manufacturing a turbine-engine blade made from composite material, comprising a bottom mold part, a recess of which is substantially complementary to a bottom part of a blade preform, and a top part, a recess of which is substantially complementary to a top part of the blade preform, said top part being able to be attached to said bottom part, wherein the bottom part comprises at least one cavity that opens into the recess, which is configured to be complementary to an immobilization element secured to the blade preform, and which is able to provide reception thereof.

7. Impregnation mold according to claim 6, wherein the cavity opens into a part of the recess in the bottom part of the mold that does not delimit a functional surface of the final blade.

8. Impregnation mold according to claim 6, wherein said cavity has a shape complementary to a pin.

\* \* \* \* \*